United States Patent
Cheng et al.

(10) Patent No.: US 10,270,716 B2
(45) Date of Patent: Apr. 23, 2019

(54) SWITCHING DEVICE BASED ON REORDERING ALGORITHM

(71) Applicant: Huawei Technologies Co., Ltd., Shenzhen (CN)

(72) Inventors: Hongtao Cheng, Shanghai (CN); Hao Cheng, Shanghai (CN); Guankai Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/467,502

(22) Filed: Mar. 23, 2017

(65) Prior Publication Data

US 2017/0279742 A1    Sep. 28, 2017

(51) Int. Cl.
*H04L 12/861* (2013.01)
*H04L 12/931* (2013.01)
(Continued)

(52) U.S. Cl.
CPC .......... *H04L 49/9057* (2013.01); *H04L 49/10* (2013.01); *H04L 49/253* (2013.01);
(Continued)

(58) Field of Classification Search
CPC ... H04L 49/9057; H04L 49/10; H04L 49/253; H04L 49/254; H04L 49/30; H04L 49/40; H04L 49/90
See application file for complete search history.

(56) References Cited

U.S. PATENT DOCUMENTS

| 5,325,356 A | 6/1994 | Lyles |
| 9,432,298 B1 * | 8/2016 | Smith ................. H04L 49/9057 |

(Continued)

FOREIGN PATENT DOCUMENTS

| CN | 104221331 A | 12/2014 |
| CN | 105144645 A | 12/2015 |

OTHER PUBLICATIONS

Foreign Communication From a Counterpart Application, European Application No. 17162393.7, Extended European Search Report dated Jul. 31, 2017, 7 pages.

(Continued)

*Primary Examiner* — Eric Myers
(74) *Attorney, Agent, or Firm* — Conley Rose, P.C.

(57) ABSTRACT

A switching device includes a processor, an input buffer, an output buffer, and a Banyan switching architecture, where the processor is configured to convert an initial switching table to a non-congestion switching table and an order-adjustment table using a preset reordering algorithm; the input buffer is configured to save first period data that is from an input port; the processor is further configured to perform, using the non-congestion switching table, data switching on data in the first full-period data saved in the input buffer, to obtain second full-period data; the Banyan switching architecture is configured to perform synchronous data switching on the second full-period data; the output buffer is configured to save the second full-period data on which the synchronous data switching has been performed; the processor is further configured to adjust, using the order-adjustment table, a data order of the second period data.

11 Claims, 4 Drawing Sheets

(51) Int. Cl.
*H04L 12/933* (2013.01)
*H04L 12/935* (2013.01)
*H04L 12/937* (2013.01)

(52) U.S. Cl.
CPC ............ *H04L 49/254* (2013.01); *H04L 49/30* (2013.01); *H04L 49/40* (2013.01); *H04L 49/90* (2013.01)

(56) References Cited

U.S. PATENT DOCUMENTS

| | | |
|---|---|---|
| 2004/0165598 A1 | 8/2004 | Shrimali et al. |
| 2009/0181663 A1* | 7/2009 | Hu .......................... H04L 49/90 455/422.1 |
| 2013/0259048 A1 | 10/2013 | Anantharam et al. |
| 2015/0172219 A1 | 6/2015 | Johansson et al. |
| 2017/0134266 A1 | 5/2017 | Venkata et al. |

OTHER PUBLICATIONS

Foreign Communication From a Counterpart Application, Chinese Application No. 201610169521.9, Chinese Office Action dated Jun. 29, 2018, 5 pages.

\* cited by examiner

| Input port 0 | A(0,0) | A(0,1) | A(0,2) | A(0,3) | A(0,4) | A(0,5) |
|---|---|---|---|---|---|---|
| Input port 1 | A(1,0) | A(1,1) | A(1,2) | A(1,3) | A(1,4) | A(1,5) |
| Input port 2 | A(2,0) | A(2,1) | A(2,2) | A(2,3) | A(2,4) | A(2,5) |
| Input port 3 | A(3,0) | A(3,1) | A(3,2) | A(3,3) | A(3,4) | A(3,5) |

⇩ Switching relationship

| Output port 0 | A(1,1) | A(0,1) | A(0,2) | A(0,3) | A(3,2) | A(0,5) |
|---|---|---|---|---|---|---|
| Output port 1 | A(1,0) | A(2,1) | A(1,2) | A(2,0) | A(3,5) | A(1,5) |
| Output port 2 | A(1,3) | A(0,0) | A(2,2) | A(2,3) | A(3,0) | A(2,5) |
| Output port 3 | A(2,4) | A(3,1) | A(0,4) | A(3,3) | A(3,4) | A(1,4) |

Initial switching table

SWITCHING DEVICE BASED ON REORDERING ALGORITHM

CROSS-REFERENCE TO RELATED APPLICATION

This application claims priority to Chinese Patent Application No. 201610169521.9, filed on Mar. 23, 2016, which is hereby incorporated by reference in its entirety.

TECHNICAL FIELD

The present disclosure relates to the field of communications technologies, and in particular, to a switching device based on a reordering algorithm.

BACKGROUND

The Common Public Radio Interface (CPRI) specification is used for an interface between a radio equipment control (REC) unit and a radio equipment (RE). The interface is an internal interface and is used at a physical layer and a data link layer. For ease of understanding, a CPRI may be abstracted as a periodic data channel. As shown in FIG. 1, FIG. 1 is a data channel whose CPRI period is 6, that is, there are 6 pieces of data within each CPRI period. In an actual application, a CPRI period of a 10 Gigabit (G) data channel is 128, and a CPRI period of a 20G data channel is 320. Similar to Ethernet switching, CPRI switching is an important part of a communications network topology that includes a CPRI. In an actual application, to complete a communications network topology that includes a CPRI, CPRI switching needs to be implemented.

An existing solution is directly performing switching according to a switching relationship table.

In the existing solution, switching is directly performed according to a switching relationship table. Because the switching relationship table is arbitrary, a situation in which an input port distributes data to all output ports at a same moment needs to be considered. In this case, a CPRI switching architecture design in the existing solution is complex, a quantity of ports is limited, and it is hard to implement it at a backend.

SUMMARY

Embodiments of the present disclosure provide a switching device based on a reordering algorithm, so as to simplify a switching design, increase a quantity of ports, and avoid causing trouble to a backend.

A first aspect of the present disclosure provides a switching device based on a reordering algorithm, including a processor, an input buffer, an output buffer, and a Banyan switching architecture, where the processor is configured to convert an initial switching table to a non-congestion switching table and an order-adjustment table using a preset reordering algorithm; the input buffer is configured to save first period data that is from an input port; the processor is further configured to perform, using the non-congestion switching table, data switching on data in the first period data saved in the input buffer, to obtain second period data; the Banyan switching architecture is configured to perform synchronous data switching on the second period data; the output buffer is configured to save the second period data on which the synchronous data switching has been performed; and the processor is further configured to adjust, using the order-adjustment table, a data order of the second period data on which the synchronous data switching has been performed and that is saved in the output buffer, to obtain third period data.

Optionally, the non-congestion switching table satisfies that in each column of the table, data that is from a same input port (one port corresponds to one row) is no more than one piece. The purpose is to ensure that all data in output ports in a same column does not come from a same input port repeatedly. For switching, this is non-congestion.

Optionally, the order of multiple pieces of data in a row may be adjusted only within the row.

Optionally, the first period data refers to data within one period or data within multiple periods.

By converting the initial switching table to the non-congestion switching table and the order-adjustment table, the Banyan switching architecture may be used by means of the non-congestion switching table, thereby simplifying a switching design, increasing a quantity of ports, and avoiding causing trouble to a backend. Finally, data switching is implemented using the order-adjustment table.

With reference to the first aspect of the present disclosure, a first implementation manner of the first aspect of the present disclosure includes the switching device further includes a memory, where the memory is configured to store a driver program of the processor; and the processor is configured to convert, when being driven by the driver program, the initial switching table to the non-congestion switching table and the order-adjustment table using the preset reordering algorithm in the driver program.

With reference to the first implementation manner of the first aspect of the present disclosure, a second implementation manner of the first aspect of the present disclosure includes the processor includes a central processing unit (CPU) or a digital signal processor (DSP).

With reference to the first aspect of the present disclosure, a third implementation manner of the first aspect of the present disclosure includes the processor includes a logic gate circuit, and the reordering algorithm is preset in the processor in a form of the logic gate circuit.

With reference to the first aspect of the present disclosure, the first implementation manner of the first aspect of the present disclosure, the second implementation manner of the first aspect of the present disclosure, or the third implementation manner of the first aspect of the present disclosure, a fourth implementation manner of the first aspect of the present disclosure includes the input buffer includes an input ping-pong buffer, and the output buffer includes an output ping-pong buffer.

With reference to the first aspect of the present disclosure, the first implementation manner of the first aspect of the present disclosure, the second implementation manner of the first aspect of the present disclosure, the third implementation manner of the first aspect of the present disclosure, or the fourth implementation manner of the first aspect of the present disclosure, a fifth implementation manner of the first aspect of the present disclosure includes the Banyan switching architecture complies with the CPRI specification.

With reference to the first aspect of the present disclosure, the first implementation manner of the first aspect of the present disclosure, the second implementation manner of the first aspect of the present disclosure, the third implementation manner of the first aspect of the present disclosure, the fourth implementation manner of the first aspect of the present disclosure, or the fifth implementation manner of the first aspect of the present disclosure, a sixth implementation manner of the first aspect of the present disclosure includes the switching device includes M input ports and M output ports, where input period data of each input port includes N pieces of data, and output period data of each output port includes N pieces of data; and the first period data includes M×N pieces of data, the second period data includes M×N pieces of data, the third period data includes M×N pieces of data, and M and N are integers greater than 1.

With reference to the sixth implementation manner of the first aspect of the present disclosure, a seventh implementation manner of the first aspect of the present disclosure includes the first period data is expressed using a first data table, the input period data of each input port separately occupies one row of the first data table, each row of the first data table includes N cells (each cell corresponds to one column), each piece of data in the input period data of each input port occupies one cell according to a preset order; the second period data is expressed using a second data table, each column of data in the second data table does not include two or more pieces of data that are from a same input port, and the third period data is expressed using a third data table.

Optionally, the order of data in multiple cells of a row may be adjusted only within the row.

With reference to the sixth implementation manner of the first aspect of the present disclosure, an eighth implementation manner of the first aspect of the present disclosure includes the third period data is output through the M output ports.

With reference to the eighth implementation manner of the first aspect of the present disclosure, a ninth implementation manner of the first aspect of the present disclosure includes the processor is configured to control an output order of the input buffer, so as to perform data switching on the data in the first period data using the non-congestion switching table, and control an output order of the output buffer, so as to adjust, using the order-adjustment table, the data order of the second period data on which the synchronous data switching has been performed.

It can be seen from the foregoing technical solutions that the embodiments of the present disclosure have the following advantages. By converting an initial switching table to a non-congestion switching table and an order-adjustment table, a Banyan switching architecture may be used by means of the non-congestion switching table, thereby simplifying a switching design, increasing a quantity of ports, and avoiding causing trouble to a backend. Finally, data switching is implemented using the order-adjustment table.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

Embodiments of the present disclosure provide a switching device based on a reordering algorithm, so as to simplify a switching design, increase a quantity of ports, and avoid causing trouble to a backend.

To make a person skilled in the art understand the technical solutions in the present disclosure better, the following clearly describes the technical solutions in the embodiments of the present disclosure with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
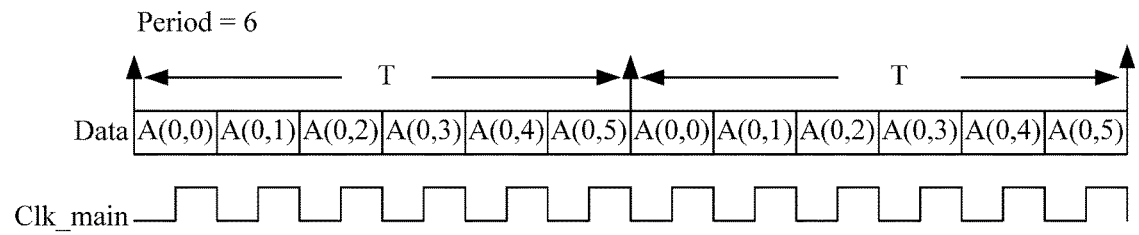
FIG. 1 is a periodic schematic diagram of a CPRI according to an embodiment of the present disclosure.
Figure 2:
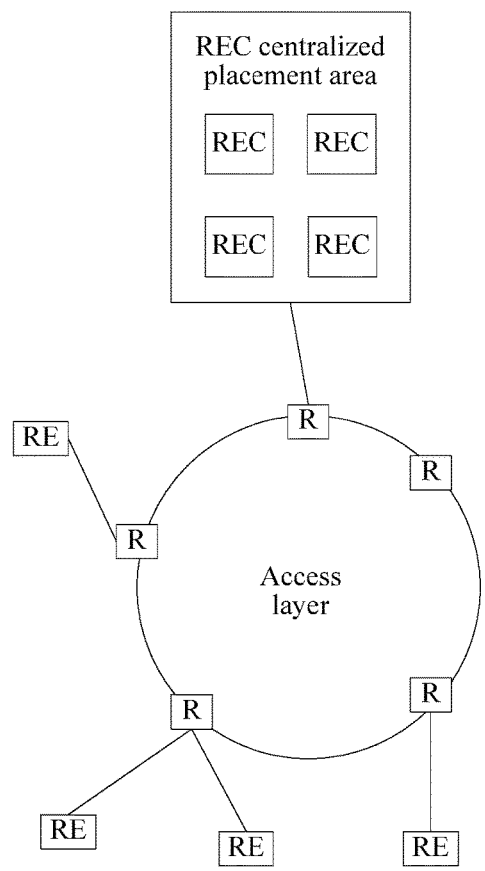
FIG. 2 is an architectural diagram of an REC and an RE according to an embodiment of the present disclosure.

In the embodiments of the present disclosure, a CPRI is an interface between an REC and an RE. The interface is an internal interface and is used in a physical layer and a data link layer. An architectural diagram of RECs and REs is shown in FIG. 2, where R in FIG. 2 represents a transmission device on a bearer transmission network, and the transmission device may be a switching device and complies with the CPRI specification. In FIG. 2, the RECs are placed in an REC centralized placement area in a centralized manner. The REs are placed far away by means of the bearer transmission network. Wireless construction costs and maintenance costs may be greatly reduced by means of centralized placement of the RECs, and transmission channel laying costs may also be reduced using the transmission network to bear data transmission between the RECs and the REs.

The following describes a switching device based on a reordering algorithm with reference to specific embodiments and the accompanying drawings.

Figures 3, 4:
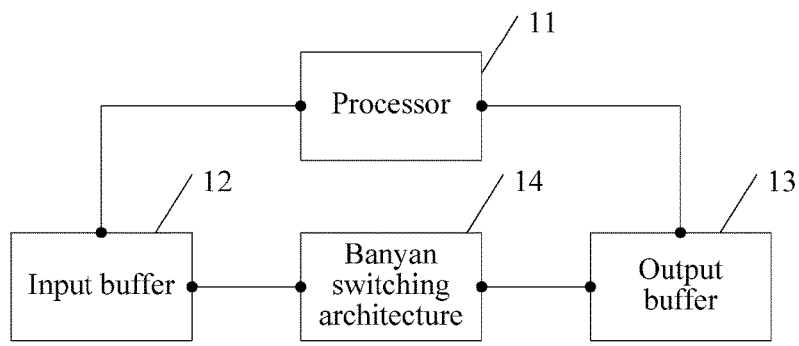
FIG. 3 is a schematic diagram of a switching device based on a reordering algorithm according to an embodiment of the present disclosure.
FIG. 4 is a schematic diagram of input period data being switched in accordance with an initial switching table according to an embodiment of the present disclosure.

An embodiment of the present disclosure provides a switching device based on a reordering algorithm, which may be R shown in FIG. 2. As shown in FIG. 3, the switching device includes a processor 11, an input buffer 12, an output buffer 13, and a Banyan switching architecture 14.

The processor 11 is configured to convert an initial switching table to a non-congestion switching table and an order-adjustment table using a preset reordering algorithm. The reordering algorithm may be implemented based on software or hardware (a logic gate circuit), and is configured to drive the processor 11 to convert an initial switching table, which is required for switching, to a non-congestion switching table and an order-adjustment table. Switching performed first using the non-congestion switching table and then using the order-adjustment table is equivalent to switching performed using the initial switching table. Therefore, the order-adjustment table is, after reverse conversion on the basis of the non-congestion switching table, equivalent to the initial switching table.

It should be noted that, according to the prior art, period data obtained by performing direct data switching on data in first period data using the initial switching table is the third period data.

The input buffer 12 is configured to save first period data that is from an input port.

The processor 11 is further configured to perform, using the non-congestion switching table, data switching on data in the first period data saved in the input buffer 12, to obtain second period data.

The Banyan switching architecture 14 is configured to perform synchronous data switching on the second period data.

The output buffer 13 is configured to save the second period data on which the synchronous data switching has been performed.

The processor 11 is further configured to adjust, using the order-adjustment table, a data order of the second full-period data on which the synchronous data switching has been performed and that is saved in the output buffer 13, to obtain third period data.

The first period data may be data within one period, or may be data within multiple periods. In an actual application, the first period data is preferably data within one period.

The switching device further includes a memory. The memory is configured to store a driver program of the processor.

The processor 11 is configured to convert, when being driven by the driver program, the initial switching table to the non-congestion switching table and the order-adjustment table using the preset reordering algorithm in the driver program.

The processor 11 includes a CPU or a DSP.

The processor 11 includes a logic gate circuit, and the reordering algorithm is preset in the processor in a form of the logic gate circuit.

The input buffer 12 includes an input ping-pong buffer, and the output buffer 13 includes an output ping-pong buffer.

The Banyan switching architecture 14 complies with the CPRI specification. The Banyan switching architecture 14 includes an order adjustment network and a switching network. The Banyan switching architecture 14 is a classical switching architecture, and therefore is not described again in this embodiment of the present disclosure.

The switching device includes M input ports and M output ports. Input period data of each input port includes N pieces of data, and output period data of each output port includes N pieces of data.

The first period data includes M×N pieces of data, the second period data includes M×N pieces of data, and the third period data includes M×N pieces of data. M and N are integers greater than 1, for example, M is 4 and N is 6. A value of M and a value of N may be the same or may be different.

The first period data is expressed using a first data table, the input period data of each input port separately occupies one row of the first data table. Each row of the first data table includes N cells. Each piece of data in the input period data of each input port occupies one cell according to a preset order. The second period data is expressed using a second data table. Each column of data in the second data table does not include two or more pieces of data that are from a same input port. The third period data is expressed using a third data table.

That each column of data in the second data table does not include two or more pieces of data that are from a same input port includes that each column of data in the second data table does not include two pieces of data that are from a same input port. That each piece of data in the input period data of each input port occupies one cell according to a preset order may be, assuming that input period data of an input port is $A(0, 0)$, $A(0, 1)$, $A(0, 2)$, $A(0, 3)$, and $A(0, 4)$, the input period data occupies the first row of the table, and there are five cells from left to right in the first row of the table, then the five cells from left to right are sequentially occupied by $A(0, 0)$, $A(0, 1)$, $A(0, 2)$, $A(0, 3)$, and $A(0, 4)$.

The third period data is output through the M output ports.

The processor 11 is configured to control an output order of the input buffer 12, so as to perform data switching on the data in the first period data using the non-congestion switching table, and control an output order of the output buffer 13, so as to adjust, using the order-adjustment table, the data order of the second period data on which the synchronous data switching has been performed.

To make it easy to understand relationships among the initial switching table, the non-congestion switching table, and the order-adjustment table, the following gives a description using a specific example.

Referring to FIG. 4, FIG. 4 is a schematic diagram of input period data being switched according to an initial switching table. X in $A(X, Y)$ represents an input port number, and Y represents the $Y^{th}$ piece of data of the input port. For example, $A(0, 0)$ represents the $0^{th}$ piece of data of input port 0, and after switching, a position of $A(0, 0)$ in output port 2 is correspondingly the first piece of data of output port 2. $A(1, 0)$ represents the $0^{th}$ piece of data of input port 1, and after switching, a position of $A(1, 0)$ in output port 1 is correspondingly the $0^{th}$ piece of data of output port 1.

Figure 5:
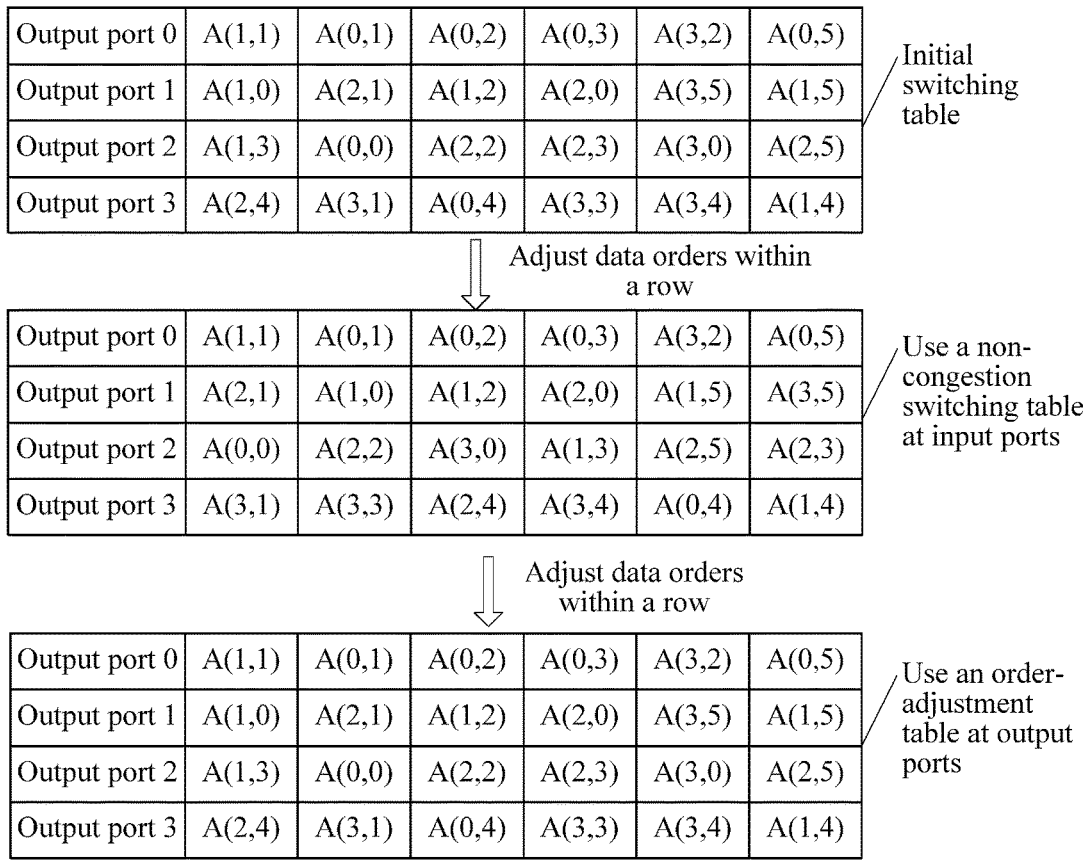
FIG. 5 is a schematic diagram of an initial switching table being converted to a non-congestion switching table and an order-adjustment table according to an embodiment of the present disclosure.

Referring to FIG. 5, FIG. 5 is a schematic diagram of an initial switching table being converted to a non-congestion switching table and an order-adjustment table.

Figure 6:
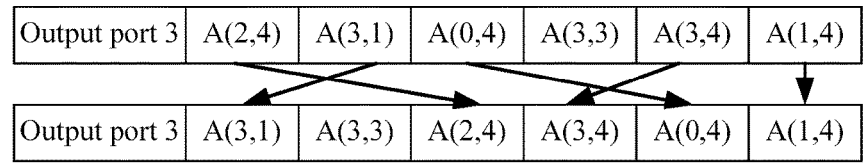
FIG. 6 is a schematic diagram of a data adjustment within a row according to an embodiment of the present disclosure.
Figure 7:
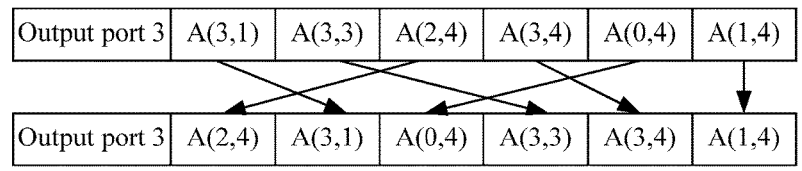
FIG. 7 is a schematic diagram of a reverse data adjustment within a row according to an embodiment of the present disclosure.

It can be seen from FIG. 5 that the non-congestion switching table used by the input port satisfies that the final effect of an adjustment is that in each column, data that is from a same input port is no more than one piece. Optionally, the order of data in a row may be adjusted only within the row. Using FIG. 6 as an example, FIG. 6 is a schematic diagram of a data adjustment within a row. Using output port 3 as an example, a data order may be adjusted only within a row; only an intra-port data order is changed while an inter-port data relationship is destroyed. Before data of output port 3 is output, the data order in FIG. 6 needs to be reversely adjusted. Referring to FIG. 7 for details, FIG. 7 is a schematic diagram of a reverse data order adjustment within a row. Using output port 3 as an example, the order of data in output port 3 is restored to the initial order.

It should be noted that the purpose of converting the initial switching table to the non-congestion switching table using the preset reordering algorithm (where the preset reordering algorithm is a typical matching algorithm in the graph theory) is to ensure that all data in output ports in a same column is from different input ports. For switching, this is non-congestion.

The Banyan switching architecture is a typical switching architecture, and cannot adapt to synchronous switching in which congestion occurs. However, a switching table used by input ports is a non-congestion switching table, which meets a constraint of the Banyan switching architecture, and therefore the Banyan switching architecture be extended freely and can adapt to different port quantities.

Figure 8:
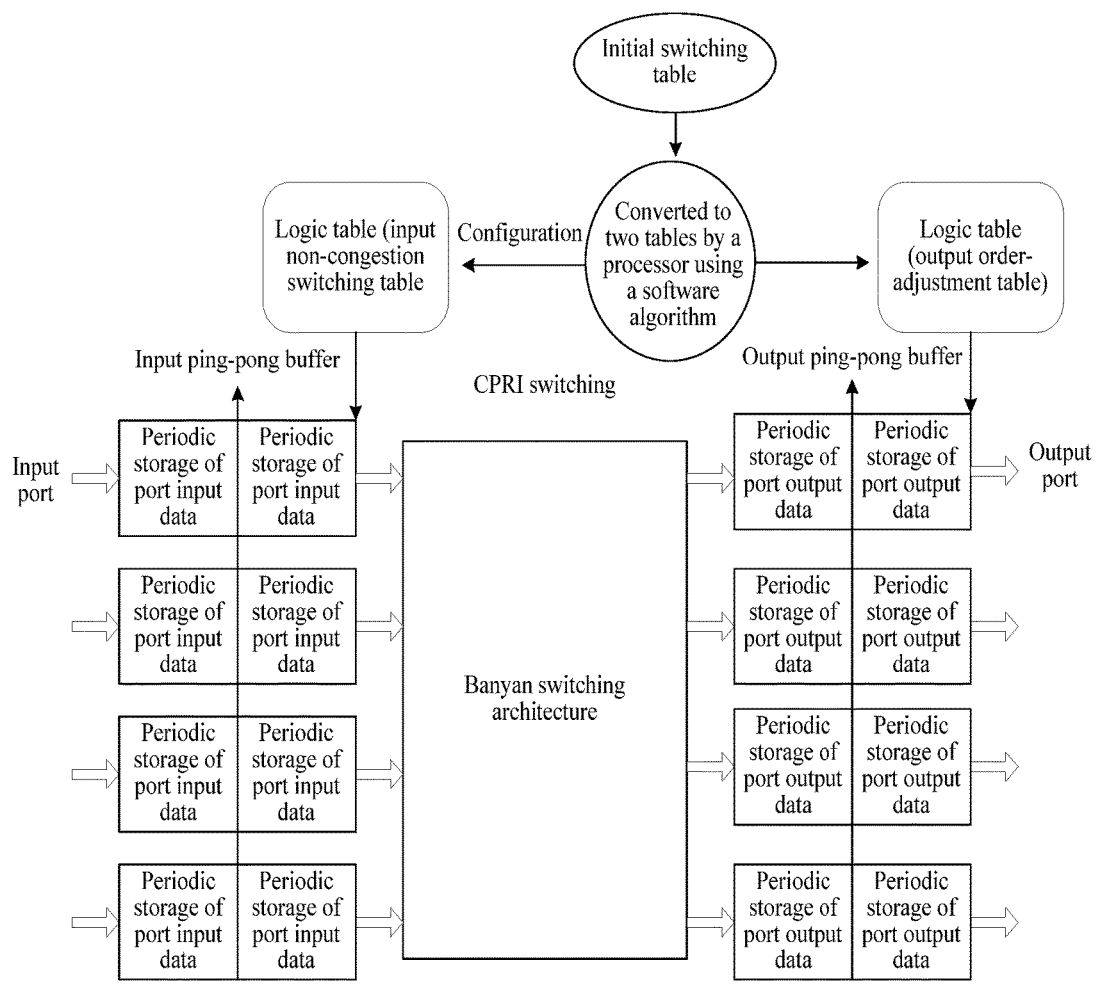
FIG. 8 is another schematic diagram of a switching device based on a reordering algorithm according to an embodiment of the present disclosure.

Referring to FIG. 8, FIG. 8 is another schematic diagram of a switching device based on a reordering algorithm.

In FIG. 8, the initial switching table is converted to two tables using a software algorithm: a non-congestion switching table and an order-adjustment table respectively.

Input and output data is temporarily stored in a random access memory (RAM) by means of ping-pong data buffering, and a Banyan switching architecture is used in the middle part.

An objective of an input ping-pong buffer is to collect input period data. Data in a port is switched according to an order obtained after the adjustment. Input period data may be data within one period or data within multiple periods, that is, the input period data is full-period data.

An objective of an output ping-pong buffer is to collect output period data, and adjust an output order of the data.

If a Banyan switching architecture having 32 ports is used as a switching architecture, resources needed are: RAM: 160*64*2*2*32=1.31 million bits; and Register: 0.04 million bits.

If the architecture is to be implemented under a process condition of 28 nanometers (nm), a length of five millimeters is sufficient, and an overall gain is 10 or more times that of the existing solution.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A switching device based on a reordering algorithm, comprising:
   a processor configured to convert an initial switching table to a non-congestion switching table and to an order-adjustment table using a preset reordering algorithm;
   an input buffer coupled to the processor, the input buffer configured to save first period data from a plurality of input ports;
   a Banyan switching architecture coupled to the input buffer, the Banyan switching architecture configured to perform synchronous data switching on second period data;
   an output buffer coupled to the processor, the output buffer configured to receive the second period data; and
   M input ports and M output ports, input period data of each input port comprising N pieces of data, and output period data of each output port comprising N pieces of data, wherein the first period data comprises M×N pieces of data, the second period data comprises M×N pieces of data, and M and N are integers greater than 1,
   wherein the first period data are expressed using a first data table, wherein the input period data of each input port separately occupies one row of the first data table, each row of the first data table comprising N cells, and each piece of data in the input period data of each input port occupying one cell according to a preset order,
   wherein the processor is further configured to:
      perform, using the non-congestion switching table, data switching on the first period data saved in the input buffer to obtain the second period data, wherein the second period data is expressed using a second data table, wherein each column of data in the second data table does not comprise two or more pieces of data that are in a row from a same input port, and
      adjust, using the order-adjustment table, a data order of the second period data to obtain third period data.

2. The switching device of claim 1, wherein the switching device further comprises a memory, wherein the memory is configured to store a driver program of the processor, and wherein the processor is configured to convert, when being driven by the driver program, the initial switching table to the non-congestion switching table and the order-adjustment table using the preset reordering algorithm in the driver program.

3. The switching device of claim 2, wherein the processor comprises a central processing unit (CPU).

4. The switching device of claim 2, wherein the processor comprises a digital signal processor (DSP).

5. The switching device of claim 1, wherein the preset reordering algorithm is preset in the processor in a form of a logic gate circuit.

6. The switching device of claim 1, wherein the input buffer comprises an input ping-pong buffer, and wherein the output buffer comprises an output ping-pong buffer.

7. The switching device of claim 1, wherein the Banyan switching architecture complies with a Common Public Radio Interface (CPRI) specification.

8. The switching device of claim 1, wherein the third period data comprises M×N pieces of data.

9. The switching device of claim 8, wherein the third period data is expressed using a third data table.

10. The switching device of claim 8, wherein the third period data is output through the M output ports.

11. The switching device of claim 10, wherein the processor is configured to:
   control an output order of the input buffer to perform data switching on the data in the first period data using the non-congestion switching table; and
   control an output order of the output buffer to adjust, using the order-adjustment table, the data order of the second period data on which the synchronous data switching has been performed.

* * * * *

UNITED STATES PATENT AND TRADEMARK OFFICE
CERTIFICATE OF CORRECTION

PATENT NO. : 10,270,716 B2  
APPLICATION NO. : 15/467502  
DATED : April 23, 2019  
INVENTOR(S) : Hongtao Cheng, Hao Cheng and Guankai Zhao Page 1 of 1

It is certified that error appears in the above-identified patent and that said Letters Patent is hereby corrected as shown below:

On the Title Page

Item (30), Foreign Application Priority Data: insert --Mar. 23, 2016 (CN) 201610169521.9--

Signed and Sealed this  
Twenty-seventh Day of August, 2019

Andrei Iancu  
*Director of the United States Patent and Trademark Office*